United States Patent [19]

Tomko et al.

[11] Patent Number: 5,310,780
[45] Date of Patent: May 10, 1994

[54] PENETRATING STAINS AND SEALANTS FROM POLYURETHANE DISPENSIONS

[75] Inventors: Revathi Tomko, North Olmsted; Sanford L. Hertz, Shaker Heights; Buckel, Jr. Charles T., Clevland; Mitchell R. Draving, Elyria, all of Ohio

[73] Assignee: The Sherwin-Williams Company, Cleveland, Ohio

[21] Appl. No.: 112,836

[22] Filed: Aug. 26, 1993

Related U.S. Application Data

[63] Continuation of Ser. No. 976,726, Nov. 16, 1992, abandoned, which is a continuation of Ser. No. 570,932, Aug. 21, 1990, abandoned.

[51] Int. Cl.$^5$ .................... C08G 22/04; C08G 22/32
[52] U.S. Cl. ........................ 524/591; 106/34; 106/237; 106/238; 106/271; 427/195; 427/440; 524/765; 524/767
[58] Field of Search .............. 524/589, 590, 591, 765, 524/767; 106/34, 237, 238, 271; 427/195, 440

[56] References Cited

U.S. PATENT DOCUMENTS

| | | | |
|---|---|---|---|
| 4,276,329 | 6/1981 | Vasishth et al. | 427/393 |
| 4,432,797 | 2/1984 | Vasishth et al. | 106/34 |
| 4,582,873 | 4/1986 | Gaa et al. | 524/591 |
| 4,667,008 | 5/1987 | Grögler et al. | 528/68 |

FOREIGN PATENT DOCUMENTS

| | | |
|---|---|---|
| 0314378 | 5/1989 | European Pat. Off. |
| 0278278 | 10/1991 | European Pat. Off. |
| 8900610 | 1/1989 | PCT Int'l Appl. |
| 1589605 | 5/1981 | United Kingdom |
| 2215732 | 9/1989 | United Kingdom |

OTHER PUBLICATIONS

USDA Research Paper, FPL 366, Feist, et al., 1980.

*Primary Examiner*—John Kight, III
*Assistant Examiner*—John M. Cooney, Jr.
*Attorney, Agent, or Firm*—Steven W. Tan; Robert E. McDonald

[57] ABSTRACT

Low VOC penetrating compositions for staining and protecting porous substrates such as wood, concrete, cement, brick and the like, comprising aqueous dispersions of polyurethane-ureas.

28 Claims, No Drawings

PENETRATING STAINS AND SEALANTS FROM POLYURETHANE DISPENSIONS

This is a continuation of copending application Ser. No. 07/976,726 filed on Nov. 16, 1992, abandoned, which application was a continuation of prior Ser. No. 07/570,932 filed on Aug. 21, 1990, now abandoned.

BACKGROUND OF THE INVENTION

Finishes which are useful on porous substrates such as wood, concrete, cement, brick and the like typically fall into two broad classifications: surface coatings and penetrating finishes. Surface coatings can be very high molecular weight, can be highly crosslinked, and characteristically form a continuous film over the substrate. Varnishes and polyurethane clearcoats are typically classified as surface coatings.

Penetrating finishes, on the other hand, are designed to protect a substrate, and typically change a substrate's color, yet retain the natural textural appearance of the substrate. Penetrating pigmented stains, non-pigmented wood preservatives, and water sealants are typical examples of penetrating finishes. One key attribute of penetrating finishes is that they are designed so as not to form an appreciable surface film or coating on the wood/substrate. They are typically low in molecular weight and very small particle size. They are durable, well suited for textured, exposed surfaces such as siding, decks, steps and the like, can contain water repellants, and are easily applied. The ability to penetrate into the surface without leaving a significant or appreciable film on the surface virtually eliminates the peeling and cracking that varnishes and surface coatings experience.

Penetrating finishes can be further subdivided as clear systems or colored systems. The clear systems typically contain a water repellant. When applied to a wood or porous substrate, these compositions serve to protect the substrate from moisture. In addition to their protective characteristics, the colored systems are designed to change the color of the wood or porous surface without hiding the grain or texture of the substrate.

This invention is directed to penetrating finishes, particularly, penetrating stains and water sealants. In the past, commercial architectural penetrating stains and water sealants have been formulated from oil-based compositions. Many commercially available wood stains still utilize pure linseed oil. Oil-based compositions are relatively inexpensive and provide good spreading characteristics. However, such stains typically lack good abrasion resistance and good drying characteristics. They are, furthermore, typically very high in volatile organic compounds content (VOC).

With the advent of environmental laws and regulations controlling the maximum amounts of VOC permitted in paints, coatings, stains, sealants and the like, numerous attempts have been made in the prior art to formulate penetrating stains which comply with the VOC requirements.

For example, European Patent Application 0 314 378 A1 to Adkins discloses a waterborne alkyd deck stain containing a medium-long oil length water-reducible alkyd resin solubilized in water with the use of propylene glycol tertiary butyl ether as a coupling solvent. Adkins claims to have low VOC, good resistance to water, durability to abrasion and the like.

Likewise, U.S. Pat. No. 4,276,329 to Vasishth et al. discloses a composition for treating and protecting wood surfaces comprising a low molecular weight alkyd resin in a cosolvent of water and glycol ether.

U.S. Pat. No. 4,432,797 to Vasishth et al. discloses a water based thickened stain containing a film forming resin, pigment, thickener and water. The resin is taught to be either an alkyd, a water based acrylic or a water solution of a modified polysaccharide polymer.

UK Patent Application 2 215 732 A to Timperley discloses a water based wood staining composition comprising a water soluble acrylic resin and a pigment.

UK Patent 1 589 605 to Gorivaerk disclose a method of preparing a penetrating wood stain of a suspension of finely divided solids in an oil-in-water emulsion.

SUMMARY OF THE INVENTION

The present invention relates to low VOC, penetrating compositions for staining and protecting porous surfaces such as wood, concrete, cement, brick and the like. In particular, this invention relates to stable dispersions of polyurethane-ureas in water which are small particle size and which can penetrate into the surface to be coated. The dispersions of this invention are particularly useful as environmentally compliant penetrating stains and water sealants.

The present invention relates to low VOC stable, small particle size dispersions of polyurethane-ureas in an aqueous solvent which are especially suitable as penetrating stains and water sealants. The dispersions of this invention have excellent abrasion resistance, shelf stability, penetration into porous surfaces and UV light stability. These dispersions are particularly suited for use, either alone or with additional ingredients such as pigments, waxes and the like, as penetrating stains and water sealants. The polyurethane-ureas of this invention are predominantly linear molecules, having relatively no cross-linking, and are very low in molecular weight. The compositions of this invention are different from surface coatings and paints in that they do not form an appreciable film when applied over a porous substrate such as wood, concrete, cement, brick and the like.

DETAILED DESCRIPTION OF THE INVENTION

The compositions of this invention are penetrating stains and water sealants which comprise low VOC, stable dispersions of small particle size polyurethane-ureas in an aqueous media. Preferably, the particle size of the polyurethane-urea molecules is less than about 0.2 micron, and most preferably in the range of about 0.01 to about 0.1 micron. The polyurethane-ureas are predominantly linear molecules and are low in molecular weight. Prior to dispersion in water, the polyurethane-urea intermediates have a weight average molecular weight generally less than about 10,000. When dispersed in an aqueous media, the polyurethane-ureas have a theoretical free isocyanate functionality of zero and a weight average molecular weight generally less than about 50,000. Additionally, due to the low molecular weight and linear character of the molecules, the dispersions have lower viscosities, and thus, can be formulated to higher solids levels using less solvents.

The compositions of this invention are produced by first reacting at least one diol, preferably selected from the group consisting of diols such as 1) polyester diols formed from the reaction of saturated and unsaturated polyhydric alcohols such as ethylene glycol, propylene glycol, neopentyl glycol, 1,4-butanediol, 1,4-butenediol, 1,6-hexanediol, furan dimethanol, and cyclohexane dimethanol, with saturated and unsaturated polycarboxylic acids and derivatives thereof such as maleic acid, fumaric acid, itaconic acid, succinic acid, glutaric acid, adipic acid, isophthalic acid, terephthalic acid, phthalic anhydride, dimethyl terephthalate, dimer acids and the like;

2) polyesters formed by the reaction of lactones, such as caprolactone, with a diol;

3) polyether diols such as the products of the polymerization of a cyclic oxide such as ethylene oxide, propylene oxide or tetrahydrofuran;

4) polyether diols formed by the addition of one or more cyclic oxides to water, ethylene glycol, propylene glycol, diethylene glycol, cyclohexane dimethanol, glycerol, or Bisphenol A;

5) polycarbonate diols such as the reaction product of 1,3-propanediol, 1,4-butanediol, 1,6-hexanediol, diethylene glycol or tetraethylene glycol with diaryl carbonates such as diphenyl carbonate or phosgene;

6) polyacetal diols such as the reaction product of a glycol such as diethylene glycol, triethylene glycol or hexanediol with formaldehyde;

7) low molecular weight diols such as dihydroxyalkanoic acids including dimethylolpropionic acid;

and mixtures thereof, with at least one aromatic, cycloaliphatic or aliphatic diisocyanate-functional ingredient, preferably selected from the group consisting of tetramethylene diisocyanate, hexamethylene diisocyanate, 2,4-toluene diisocyanate, 2,6-toluene diisocyanate, 4,4'-diphenylmethane diisocyanate, isophorone diisocyanates, Desmodur W TM (a 4,4'-dicyclohexylmethane diisocyanate available from Mobay), benzene 1,3-bis (1-isocyanato-1-methylethyl)[m-TMXDI], and mixtures thereof.

Optionally, and preferably present during the reaction is up to about 0.06%, preferably between about 0.01% and about 0.04% (by weight based upon total solids of diol and diisocyanate) of a catalyst such as di-butyl tin dilaurate, tin octoate and the like.

The preferred ratio of diol to diisocyanate should be such that there is an excess of isocyanate functionality over hydroxy functionality. Preferably, the ratio of equivalents of NCO to OH should be between about 1.01:1 to about 1.5:1; preferably between about 1.01:1 to about 1.3:1.

To ensure that the polyurethane-urea intermediate is dispersible in an aqueous media, it is essential that a percentage of the total polymer weight solids, preferably between about 1% and about 10%, is contributed by diols, amines and/or epoxies having the ability to contribute ionic or hydrophilic groups to the polyurethane-urea. For example, diols, amines and/or epoxies containing carboxylic acid groups, sulfonic acid groups, phosphoric acid groups, ammonium salts, phosphonium salts or sulfonium salts.

The reaction is typically carried out by charging the diol with the catalyst to a reaction vessel, heating the contents to a temperature of between about 70° C. and about 100° C., and adding, via continuous or stepwise addition over a period of time, preferably between about ½ hour to about 4 hours, the diisocyanate-functional materials. Optionally present can be a solvent such as n-methyl pyrolidinone, dimethyl formamide, methyl ethyl ketone, toluene, and mixtures thereof in an amount ranging up to about 20% by weight based upon the total weight of the materials present in the reaction vessel. After complete addition of the diisocyanate materials, the reaction vessel temperature is maintained between about 80° and 100° C. for so long as necessary to bring the residual isocyanate percentage (based upon the total solids weight of the polymer) below about 3.0%, preferably into a range between about 1.6% to about 2.4%. This takes approximately 2 to 4 hours. Residual isocyanate percentage can be measured by any means well known in the art. The contents are then cooled to below about 70° C. and the ionic groups present in the product of the above reaction are then neutralized by the addition of a weak base, such as triethylamine, trimethylamine, triisopropyl amine, tributyl amine, triethylene diamine (e.g. DABCO TM, commercially available from Air Products Co.), N,N-dimethylcyclohexyl amine, N,N-dimethylstearyl amine, N,N-dimethyl aniline, N-methylmorpholine, N-ethylmorpholine, N-methylpiperazine, N-methylpyrolidine, N-methylpiperidine, N,N-dimethyl-ethanol amine, N,N-diethyl-ethanol amine, triethanol amine, N-methyldiethanol amine, dimethylaminopropanol, 2-methoxyethyldimethyl amine, N-hydroxyethylpiperazine, 2-(2-dimethylaminoethoxy)-ethanol and 5-diethylamino-2-pentanone and mixtures thereof. Most preferred neutralization agents are the tertiary amines as they are not reactive with the free isocyanate groups. The amount of weak base added should be sufficient to neutralize at least about 80% of the ionic groups present in solution. Preferably, the weak base is added in an amount sufficient to neutralize 100% of the ionic groups. The weak base can be added in excess, that is, an amount greater than that necessary to neutralize the ionic groups.

The intermediate at this point has a weight average molecular weight less than about 10,000 and, due to the di-functional character of both the diols and the diisocyanates, has predominantly linear molecules.

The intermediate is then dispersed in water, or an aqueous-based solvent. The percentage of solids in the water or aqueous solvent can range from between about 20% by weight to about 60% by weight, preferably between about 30% to 50% by weight.

A difunctional amine compound such as ethylene diamine, propylene diamine, butylene diamine, hexamethylene diamine, cyclohexylene diamine, butylene diamine, hexamethylene diamine, equivalents thereof and the like in an amount sufficient to react with up to about 80% of the theoretical amount of residual NCO functionality can optionally be included in the dispersing media for chain extension of the polyurethane. Amounts of chain extender higher that this tend to create dispersions having molecular weights which are unacceptably high for use as penetrating stains and water sealants on porous substrates. Chain extenders having a functionality greater than two should not be included in any appreciable amount due to their tendency to cause unacceptably high levels of branching, whereby the composition then acts as a film-forming polymer rather than a penetrating composition when applied to wood or another porous substrate.

Preferably, all hydroxy-functional ingredients are exclusively di-functional. A minor amount of the total number of OH equivalents can be contributed by higher-functional alcohols; however, an appreciable percentage of such alcohols is not desired as this results in an intermediate, and thus a final polymer, which exhibits high molecular weight and extensive branching. The most preferred hydroxy-functional starting materials are a combination of 1) the polyester diols formed from the reaction of saturated and unsaturated dihydric alcohols such as ethylene glycol, propylene glycol, neopentyl glycol, 1,4-butanediol, 1,4-butenediol, 1,6-hexanediol, furan dimethanol, and cyclohexane dimethanol with saturated and unsaturated polycarboxylic acids such as maleic acid, fumaric acid, itaconic acid, succinic acid, glutaric acid, adipic acid, isophthalic acid, terephthalic acid, phthalic anhydride, dimethyl terephthalate, dimer acids and the like; and 2) a diol containing hydrophilic groups. One such preferred polyester diol is Rucoflex TM 1015-120 (a mixture of polyester diols based on neopentyl glycol, hexanediol and adipic acid, commercially available from Ruco Polymer Corporation). A particularly preferred diol containing hydrophilic groups is dimethylolpropionic acid. When used, these two diols are preferably present in percentages such that the Rucoflex material contributes between about 40% to about 70% of the OH functionality of the total materials.

The isocyanate-functional materials are most preferably exclusively diisocyanates selected from the group consisting of Desmodur W TM (4,4'-dicyclohexylmethane diisocyanate), m-TMXDI (benzene 1,3-bis (1-isocyanato-1-methylethyl)), IPDI (isophorone diisocyanates) and mixtures thereof. Most preferred is a combination of Desmodur W TM and m-TMXDI.

As with the alcohols, a minor percentage of the isocyanate-functional materials can have a functionality greater than two, however, for the same reasons, an appreciable percentage of such isocyanate ingredients is not acceptable due to the effect on molecular weight and chain branching of both the intermediate and the final product. When a mixture of two or more diisocyanates is used, the ratio of NCO equivalents contributed by the individual isocyanates is not critical.

The dispersing media is preferably water. Preferred is water with a small percentage of diamine present or added for chain extension with the residual NCO. The amount of dispersing media should be between about 40% and about 80% by weight of total reaction ingredients. More preferably, the percentage of dispersing media is between about 50% and 80% by weight. When a chain extension agent is used, it should preferably be present or added in an amount sufficient to react with up to about 80% of the residual NCO functionality. The final, chain-extended dispersion, should have a weight average molecular weight less than about 50,000.

Once dispersed into the dispersing media, the composition can be modified with other standard ingredients commonly used to formulate penetrating stains, wood preservatives and water sealants. For example, the dispersions of this invention can be combined with other ingredients such as pigments, colorants, paraffins, waxes, UV light stabilizers, rheology modifiers, mildewcides, biocides, fungicides, and other conventional additives to form excellent penetrating stains, preservatives and/or sealants for wood, concrete, cement, brick and other porous architectural surfaces. Colorants and pigment dispersions, when used, are typically added in amounts up to about 15% by volume of the total composition. Paraffin and ethylene waxes, used to impart water resistance to penetrating finishes, when used, are typically added in amounts up to about 2-3% by weight of the total composition.

It is highly preferred that a surface tension modifying ingredient be added to the composition to lower the surface tension of the carrier. It has been found that it is preferred to add such a surface tension modifying ingredient as this enables the composition to more easily penetrate into the porous substrate to which it is applied. Suitable solvents for use as surface tension modifying ingredients include the 2,2,4-trimethyl-alkyl diol monoisobutyrate solvents available from Eastman Chemical marketed under the Texanol TM brand name, glycols such as ethylene glycol, propylene glycol, dipropylene glycol, and the like, glycol ethers such as 2-butoxy ethanol (Butyl Cellosolve TM), diethylene glycol monobutyl ether (Butyl Carbitol TM), and the like, and alcohols such as methanol, ethanol, propanol and the like; and mixtures thereof. Generally, the surface tension modifying agent should be included in an amount sufficient to lower the surface tension of the carrier to a level where the composition will achieve the desired penetration into the porous substrate. Typically, the amount of surface tension modifying agent required is from between about 0.25% to about 5.0% by volume based upon the total volume of the composition. However, it should be appreciated that many standard stain and sealant additives are commercially available in a media which imparts some surface tension modifying activity. In particular, it should be appreciated that many commercially available rheology modifiers are sold in glycol and glycol ether media. The media may contribute some surface tension modifying properties. For example, the Rheolate TM materials are commercially available in a butyl carbitol media. Additionally, some mildewcides and fungicides are commercially available in petroleum distillate media. These media additionally may impart some surface tension modifying characteristics. In general, media which would be expected to impart surface tension modifying activity and which are present in an appreciable amount should be included when calculating the total percentage of surface tension modifying agents.

The following examples demonstrate the methods of preparation of the penetrating finishes of this invention. The examples are intended to be representative of the formulations which can be made and are not intended to limit the scope of the invention.

EXAMPLE I—PREPARATION OF THE DISPERSION

Charge 112.2 g of n-methyl pyrolidinone, 591.96 g of Rucoflex 1015–120 (1.3 eq of OH), 69.74 g of dimethylolpropionic acid (1.04 eq of OH) and 1.6 g of dibutyl tin dilaurate (10% solution in n-methyl pyrolidinone) to a reaction vessel equipped with a nitrogen blanket. Begin stirring and increase temperature to about 80° C. Begin a two hour addition of 161.6 g of Desmodur W (1.23 eq of NCO) and 188.03 g of m-TMXDI (1.54 eq of NCO). After addition of all isocyanate-functional materials, hold the reaction at 80° C. for approximately 3 hours. Add 63.02 g of triethylamine to neutralize the ionic groups and hold the reaction for another ½ hours. Disperse the resultant material into 1500 g of water and add 10.4 g of ethylene diamine.

Dispersions prepared according to the above generally have the following characteristics:
Molecular weight:<50,000 (wt. ave)
Particle Size:<0.1 micron

EXAMPLE II—WOOD STAIN

The following represents a typical penetrating stain composition using the polyurethane-urea dispersion of Example I to which standard commercially available tinting colorants and pigment dispersions may be added

| | |
|---|---|
| Water | 610.20 g |
| Dispersion of Example I | 170.80 |
| Texanol | 15.84 |
| Troysan Mildew-/Fungicide | 10.50 |
| Magesium Silicate (Flaky) | 10.00 |
| Rheolate 255 Thickener | 9.00 |
| Michemlube 511 Wax | 7.00 |
| Rheolate 278 Thickener | 3.00 |
| Tinuvin UV Absorber | 3.00 |
| Min-u-gel 440 Attapulgite Clay | 2.00 |
| Anionic Surfactant | 1.00 |
| pH buffer | 1.00 |
| Proxcel Biocide | 0.40 |
| Defoamer | 0.40 |
| | 844.14 g |

EXAMPLE III—WATER SEALANT

The following represents a typical, non-pigmented, water sealant composition using the polyurethane-urea dispersion of Example I.

| | |
|---|---|
| Water | 614.11 g |
| Dispersion of Example I | 205.87 |
| 2-butoxy ethanol | 16.68 |
| Michemlube 511 Wax | 4.00 |
| 2-amino-2-methyl-1-propanol (pH buffer) | 2.00 |
| Dow Versene 100 | 1.00 |
| | 843.66 g |

In preparing the above water sealant, it is highly preferred to render inactive metallic ions which might be present in the water and would tend to precipitate out of solution upon addition of the surface tension modifying agent.

What is claimed is:

1. A composition comprising:
   a) a dispersion of a polyurethane-urea in an aqueous media having a particle size diameter of less than about 0.2 micron; wherein the polyurethane-urea comprises the dispersion in an aqueous media of the reaction product of:
      i) at least one diol with
      ii) at least one diisocyanate-functional material;
   wherein the reaction between i) and ii) takes place in the presence of between about 0.01% to about 0.06% by weight of a catalyst; wherein the ratio of i) to ii) is such that the ratio of isocyanate functionality to hydroxy functionality is in the range of between about 1.01:1 to about 1.5:1; wherein between about 1% and about 10% of the total polymer weight solids is contributed by diols having the ability to contribute ionic or hydrophilic groups to the polyurethane-urea; wherein the reaction product of i) and ii) is at least about 80% neutralized with a weak base prior to dispersion in said aqeuous media; and
   b) a surface tension modifying agent selected from the group consisting of the 2,2,4-trimethyl-alkyl diol monoisobutyrate solvents; glycols; glycol ethers; alcohols; and mixtures thereof in an amount effective to lower the surface tension of the composition so that the composition, when applied over a porous architectural substrate, penetrates into said substrate and does not form an appreciable film on said substrate.

2. The composition of claim 1 wherein the diol the group consisting of:
   a) polyester diols formed from the reaction of saturated and unsaturated dihydric alcohols with saturated and unsaturated polycarboxylic acids and derivatives thereof;
   b) polyesters formed by the reaction of lactones with a diol;
   c) polyether diols resulting from the polymerization of a cyclic oxide;
   d) polyether diols formed by the addition of one or more cyclic oxides to water, ethylene glycol, propylene glycol, diethylene glycol, cyclohexane dimethanol, glycerol, or Bisphenol A;
   e) polycarbonate diols resulting from the reaction of 1,3-propanediol, 1,4-butanediol, 1,6-hexanediol, diethylene glycol or tetraethylene glycol with diaryl carbonates;
   f) polyacetal diols resulting from the reaction of a glycol with formaldehyde;
   g) low molecular weight dihydroxyalkanoic acids; and mixtures thereof.

3. The composition of claim 1 wherein the diisocyanate-functional material is selected from the group consisting of tetramethylene diisocyanate, hexamethylene diisocyanate, 2,4-toluene diixocyanate, 2,6-toluene diisocyanate, 4,4'-diphenylmethane diisocyanate, isophorone diisocyanates, 4,4'-dicyclohexylmethane diisocyanate, benzene 1,3-bis (1-isocyanate-1-methylethyl), and mixtures thereof.

4. The composition of claim 1 wherein the catalyst is selected from the group consisting of di-butyl tin dilaurate tin octoate and mixtures thereof.

5. The composition of claim 2 wherein the diisocyanate-functional material is selected from the group consisting of tetramethylene diisocyanate, hexamethylene diisocyanate, 2,4-toluene diisocyanate, 2,6-toluene diixocyanate, 4,4'-diphenylmethane diisocyanate, isophorone diisocyanates, 4,4'-dicyclohexylmethane diisocyanate, benzene 1,3-bis (1-isocyanate-1-methylethyl), and mixtures thereof.

6. The composition of claim 5 wherein the catalyst is selected from the group consisting of di-butyl tin dilaurate, tin octoate and mixtures thereof.

7. The composition of claim 1 wherein between about 1% and about 10% by weight of the total polymer weight solids is contributed by diols, amines and/or epoxies having the ability to contribute ionic or hydrophilic groups to the polyurethane-urea.

8. The composition of claim 7 wherein said diols, amines and/or epoxies contain carboxylic acid groups, sulfonic acid groups, phosphoric acid groups, ammonium salts, phosphonium salts or sulfonium salts.

9. The composition of claim further comprising a diamine chain extender in an amount sufficient to react with up to about 80% of the theoretical amount of residual NCO functionality.

10. A method of applying a waterborne, penetrating composition to a porous substrate comprising applying to the surface of a porous substrate a waterborne penetrating composition which penetrates into said substrate and does not form an appreciable film on said substrate, said waterborne penetrating composition comprising:
   a) an aqueous dispersion of a polyurethane-urea having a particle size diameter of less than about 0.2 micron; wherein the polyurethane-urea comprises the dispersion in an aqueous media of the reaction product of:
      i) at least one diol with
      ii) at least one diisocyanate-functional material;

wherein the reaction between i) and ii) takes place in the presence of between about 0.01% to about 0.06% by weight of a catalyst; wherein the ratio of i) to ii) is such that the ratio of isocyanate functionality to hydroxy functionality is in the range of between about 1.01:1 to about 1.5:1; wherein between about 1% and about 10% of the total polymer weight solids is contributed by diols having the ability to contribute ioinic or hydrophilic groups to the polyurethane-urea; wherein the reaction product of i) and ii) is at least about 80% neutralized with a weak base prior to dispersion in said aqueous media; and b) a surface tension modifying agent selected from the group consisting of the 2,2,4-trimethyl-alkyl diol monoisobutyrate solvents; glycols; glycol ethers; alcohols; and mixtures thereof in an amount effective to lower the surface tension of the composition so that the composition, when applied over a porous architectural substrate, penetrates into said substrate and does not form an appreciable film on said substrate.

11. The method of claim 10 wherein the substrate is selected from the group consisting of wood, concrete, cement and brick.

12. The method of claim 10 wherein the diol is selected from the group consisting of:

a) polyester diols formed from the reaction of saturated and unsaturated dihydric alcohols with saturated and unsaturated polycarboxylic acids and derivatives thereof;

b) polyesters formed by the reaction of lactones with a diol;

c) polyether diols resulting from the polymerization of a cyclic oxide;

d) polyether diols formed by the addition of one or more cyclic oxides to water, ethylene glycol, propylene glycol, diethylene glycol, cyclohexane dimethanol, glycerol, or Bisphenol A;

e) polycarbonate diols resulting from the reaction of 1,3-propanediol, 1,4-butanediol, 1,6-hexanediol, diethylene glycol or tetraethylene glycol with diaryl carbonates;

f) polyacetal diols resulting from the reaction of a glycol with formaldehyde;

g) low molecular weight dihydroxyalkanoic acids; and mixtures thereof.

13. The method of claim 10 wherein the diisocyanate-functional material is selected from the group consisting of tetramethylene diisocyanate, hexamethylene diisocyanate, 2,4-toluene diisocyanate, 2,6-toluene diisocyanate, 4,4'-diphenylmethane diisocyanate, isophorone diisocyanates, 4,4'-dicyclohexylmethane diisocyanate, benzene 1,3-bis (1-isocyanate-1-methylethyl), and mixtures thereof.

14. The method of claim 11 wherein between about 1% and about 10% by weight of the total polymer weight solids is contributed by diols, amines and/or epoxies having the ability to contribute ionic or hydrophilic groups to the polyurethane-urea.

15. The method of claim 14 wherein said diols, amines and/or epoxies contain carboxylic acid groups, sulfonic acid groups, phosphoric acid groups, ammonium salts, phosphonium salts or sulfonium salts.

16. The method of claim 10 wherein the waterborne penetrating composition further comprises a diamine chain extender in an amount sufficient to react with up to about 80% of the theoretical amount of residual NCO functionality.

17. A waterborne, penetrating wood stain comprising:

a) an aqueous dispersion of a polyurethane-urea having a particle size diameter of less than about 0.2 micron; wherein the polyurethane-urea comprises the dispersion in an aqueous media of the reaction product of:

i) at least one diol with ii) at least one diisocyanate-functional material;

wherein the reaction between i) and ii) takes place in the presence of between about 0.01% to about 0.06% by weight of a catalyst; wherein the ratio of i) to ii) is such that the ratio of isocyanate functionality to hydroxy functionality is in the range of between about 1.01:1 to about 1.5:1; wherein between about 1% and about 10% of the total polymer weight solids is contributed by diols having the ability to contribute ionic or hydrophilic groups to the polyurethane-urea; wherein the reaction product of i) and ii) is at least about 80% neutralized with a weak base prior to dispersion in said aqueous media;

b) at least one colorant; and c) a surface tension modifying agent selected from the group consisting of the 2,2,4-trimethyl-alkyl diol monoisobutyrate solvents; glycols; glycol ethers; alcohols; and mixtures thereof in an amount effective to lower the surface tension of the stain so that the stain, when applied over a wood substrate, penetrates into said substrate and does not form an appreciable film on said substrate.

18. The stain of claim 17 wherein the diol is selected from the group consisting of:

a) polyester diols formed from the reaction of saturated and unsaturated polyhydric alcohols with saturated and unsaturated polycarboxylic acids and derivatives there-of;

b) polyesters formed by the reaction of lactones with a diol;

c) polyether diols resulting from polymerization of a cyclic oxide;

d) polyether diols formed by the addition of one or more cyclic oxides to water, ethylene qlycol, propylene glycol, diethylene glycol, cyclohexane dimethanol, glycerol, or Bisphenol A;

e) polycarbonate diols resulting from the reaction of 1,3-propanediol, 1,4-butanediol, 1,6-hexanediol, diethylene glycol or tetraethylene glycol with diaryl carbonates;

f) polyacetal diols resulting from the reaction of a glycol with formaldehyde;

g) low molecular weight dihydroxyalkanoic acids; and mixtures thereof.

19. The stain of claim 17 wherein the diisocyanate-functional material is selected from the group consisting of tetramethylene diisocyanate, hexamethylene diisocyanate, 2,4-toluene diiosocyanate, isophorone diisocyanates, 4,4'-dicyclohexylmethane diisocyanate, benzene 1,3-bis (1-isocyanate-1-methylethyl), and mixtures thereof.

20. The stain of claim 17 wherein between about 1% and about 10% by weight of the total polymer weight solids is contributed by diols, amines and/or epoxies having the ability to contribute ionic or hydrophilic groups to the polyurethane-urea.

21. The stain of claim 20 wherein said diols, amines and/or epoxies contain carboxylic acid groups, sulfonic acid groups, phosphoric acid groups, ammonium salts, phosphonium salts or sulfonium salts.

22. The stain of claim 17 further comprising a diamine chain extender in an amount sufficient to react with up to about 80% of the theoretical amount of residual NCO functionality.

23. A waterborne, penetrating water sealant composition comprising:
   a) an aqueous dispersion of a polyurethane-urea having a particle size diameter of less than about 0.2 micron; wherein the polyurethane-urea comprises the dispersion in an aqueous media of the reaction product of:
      i) at least one diol with
      ii) at least one diisocyanate-functional meterial; wherein the reaction between i) and ii) takes place in the presence of between about 0.01% to about 0.06% by weight of a catalyst; wherein the ratio of i) to ii) is such that the ratio of isocyanate functionality to hydroxy functionality is in the range of between about 1.01:1 to about 1.5:1; wherein between about 1% and about 10% of the total polymer weight solids is contributed by diols having the ability to contribute ionic or hydrophilic groups to the polyurethane-urea; wherein the reaction product of i) and ii) is at least about 80% neutralized with a weak base prior to dispersion in said aqueous media;
   b) at least one paraffin or wax; and
   c) a surface tension modifying agent selected from the group consisting of the 2,2,4-trimethyl-alkyl diol monoisobutyrate solvents; glycols; glycol ethers; alcohols; and mixtures thereof in an amount effective to lower the surface tension of the sealant so that the sealant, when applied over a porous architectural substrate, penetrates into said substrate and does not form an appreciable film on said substrate.

24. The water sealant of claim 23 wherein the diol is selected from the group consisting of:
   a) polyester diols formed from the reaction of saturated and unsaturated polyhydric alcohols with saturated and unsaturated polycarboxylic acids and derivatives there-of;
   b) polyesters formed by the reaction of lactones with a diol;
   c) polyether diols resulting from the polymerization of a cyclic oxide;
   d) polyether diols formed by the addition of one or more cyclic oxides to water, ethylene glycol, propylene glycol, diethylene glycol, cyclohexane dimethanol, glycerol, or Bisphenol A;
   e) polycarbonate diols resulting from the reaction of 1,3-propanediol, 1,4-butanediol, 1,6-hexanediol, diethylene glycol or tetraethylene glycol with diaryl carbonates;
   f) polyacetal diols resulting from the reaction of a glycol with formaldehyde;
   g) low molecular weight dihydroxyalkanoic acids; and mixtures thereof.

25. The water sealant of claim 23 wherein the diisocyanate-functional material is selected from the group consisting of tetramethylene diisocyanate, hexamethylene diisocyanate, 2,4-toluene diisocyanate, 2,6-toluene diisocyanate, 4,4'-diphenylmethane diisocyanate, isophorone diisocyanates, 4,4'-dicyclohexylmethane diisocyanate, benzene 1,3-bis (1-isocyanate-1-methylethyl), and mixtures thereof.

26. The water sealant of claim 23 wherein between about 1% and about 10% by weight of the total polymer weight solids is contributed by diols, amines and/or epoxies having the ability to contribute ionic or hydrophilic groups to the polyurethane-urea.

27. The water sealant of claim 26 wherein said diols, amines and/or epoxies contain carboxylic acid groups, sulfonic acid groups, phosphoric acid groups, ammonium salts, phosphonium salts or sulfonium salts.

28. The water sealant of claim 23 further comprising a diamine chain extender in an amount sufficient to react with up to about 80% of the theoretical amount of residual NCO functionality.

* * * * *